US008658755B2

(12) United States Patent
Saito

(10) Patent No.: US 8,658,755 B2
(45) Date of Patent: Feb. 25, 2014

(54) SILICON-CONTAINING CURABLE COMPOSITION AND CURED PRODUCT THEREOF

(75) Inventor: Masako Saito, Tokyo (JP)

(73) Assignee: Adeka Corporation, Tokyo (JP)

( * ) Notice: Subject to any disclaimer, the term of this patent is extended or adjusted under 35 U.S.C. 154(b) by 8 days.

(21) Appl. No.: 13/391,968

(22) PCT Filed: Sep. 15, 2010

(86) PCT No.: PCT/JP2010/065962
§ 371 (c)(1),
(2), (4) Date: Feb. 23, 2012

(87) PCT Pub. No.: WO2011/048894
PCT Pub. Date: Apr. 28, 2011

(65) Prior Publication Data
US 2012/0157624 A1 Jun. 21, 2012

(30) Foreign Application Priority Data
Oct. 21, 2009 (JP) ................. 2009-242588

(51) Int. Cl.
C08G 77/12 (2006.01)
(52) U.S. Cl.
USPC ............. 528/37; 525/477; 525/478; 528/15; 528/25; 528/31; 528/32
(58) Field of Classification Search
None
See application file for complete search history.

(56) References Cited

U.S. PATENT DOCUMENTS

| | | | |
|---|---|---|---|
| 3,198,766 A * | 8/1965 | Nitzsche et al. | ................. 528/15 |
| 3,438,936 A | 4/1969 | Lamoreaux | |
| 5,196,498 A | 3/1993 | Leibfried, Sr. | |
| 7,799,887 B2 | 9/2010 | Omi et al. | |
| 2004/0214966 A1 | 10/2004 | Tabei et al. | |
| 2005/0038221 A1 | 2/2005 | Tabei et al. | |
| 2006/0243947 A1 * | 11/2006 | Tsumura et al. | ......... 252/299.01 |
| 2007/0225433 A1 | 9/2007 | Arai | |
| 2008/0021190 A1 | 1/2008 | Yaginuma et al. | |
| 2009/0012256 A1 | 1/2009 | Omi et al. | |

FOREIGN PATENT DOCUMENTS

| | | |
|---|---|---|
| CN | 101111567 | 1/2006 |
| JP | 7-149907 | 6/1995 |
| JP | 7-196806 | 8/1995 |
| JP | 8-157603 | 6/1996 |
| JP | 11-199677 | 7/1999 |
| JP | 2004-131519 | 4/2004 |
| JP | 2004-339482 | 12/2004 |
| JP | 2005-089733 | 4/2005 |
| JP | 2005-298606 | 10/2005 |
| JP | 2005-307064 | * 11/2005 |
| JP | 2007-023125 | * 1/2007 |
| JP | 2007-138098 | 6/2007 |
| JP | 2007-254675 | 10/2007 |
| WO | WO 2006/090609 | 8/2006 |

OTHER PUBLICATIONS

Machine-generated translation of JP 2007-023125 into the English language (no date).*
Office Action issued Nov. 26, 2012 by the State Intellectual Property Office (SIPO) of the People's Republic of China in counterpart Chinese application No. 201080034635.3 with full English translation, 18 pages.
International Search Report, PCT/JP2010/065962, Dec. 7, 2010.

* cited by examiner

Primary Examiner — Marc Zimmer
(74) Attorney, Agent, or Firm — Young & Thompson

(57) ABSTRACT

Provided is a silicon-containing curable composition which includes a prepolymer (A) containing two or more Si—H groups in one molecule, which is obtained by subjecting one or more kinds of a cyclic siloxane compound (α) represented the following formula (1) and one or more kinds of a compound (β) represented by the following formula (2), to a hydrosilylation reaction; a cyclic siloxane compound (B) containing, in one molecule, two or more carbon-carbon double bonds that are reactive with Si—H groups; a polysiloxane compound (C) which is different from the prepolymer (A) and the cyclic siloxane compound (B); and a hydrosilylation catalyst (D). In formula (1), $R^1$ to $R^3$ each represent an alkyl group having 1 to 6 carbon atoms, or a phenyl group; a represents a number from 2 to 10; and b represents a number from 0 to 8. In formula (2), n represents the number 1 or 2.

14 Claims, No Drawings

SILICON-CONTAINING CURABLE COMPOSITION AND CURED PRODUCT THEREOF

TECHNICAL FIELD

The present invention relates to a silicon-containing curable composition, and a cured product obtained by curing the composition. The silicon-containing curable composition and the cured product thereof are useful for electric/electronic component materials, adhesives, and the like.

BACKGROUND ART

Extensive researches have been conducted on silicon-containing compounds, and even in industry, polysiloxane compounds such as represented by silicone resins have long been utilized. However, although silicone resins have excellent heat resistance and flexibility, because silicone resins contain a lot of outgas components (volatile component), use thereof has been restricted in the production processes for electronic members and the like due to a contamination problem.

Furthermore, in recent years, along with the development of technology in the field of electronic information, various materials used therein are required to have a high level of performance. Therefore, considerations have been conducted on materials which have excellent heat resistance, transparency, and physical and electrical properties by making the best use of the characteristic properties of silicon. Among others, various technologies for producing useful compounds by applying a hydrosilylation reaction of a silicon compound have been considered. Furthermore, in the member production processes in the field of electronic information, lithographic processes are frequently used, so that high resistance to bases and high resistance to solvents have come to be demanded. Accordingly, there has been a demand for a material which satisfies high heat resistance, crack resistance and transparency all at the same time, while maintaining high resistance to bases and high resistance to solvents. In regard to these demands, various silicon-containing curable compositions have been proposed (see, for example, Patent Literatures 1 to 4).

However, even though the technologies proposed in these literatures respectively have their individual features, the materials are not satisfactory in terms of heat resistance, adherence, colorability, transparency and the like, which are properties demanded from the materials recently used in the field of electronic information.

CITATION LIST

Patent Literature

Patent Literature 1: Japanese Patent Application Laid-Open (JP-A) No. 2004-131519
Patent Literature 2: US Patent Application No. 2004/214966 A1
Patent Literature 3: US Patent Application No. 2009/12256 A1
Patent Literature 4: JP-A No. 2007-138098

DISCLOSURE OF THE INVENTION

Problem to be Solved by the Invention

Therefore, an object of the present invention is to provide a silicon-containing curable composition which has excellent heat resistance, adherence, colorability and transparency, and is useful for electric/electronic materials and the like.

Means for Solving the Problem

The inventors of the present invention conducted a thorough consideration in order to solve the problem described above, and as a result, they paid attention to the structure of a particular silicon-containing compound and a prepolymer thereof, thus completing the present invention.

Specifically, the present invention provides a silicon-containing curable composition including:

a prepolymer (A) containing two or more Si—H groups in one molecule, which is obtainable by subjecting one or more kinds of a cyclic siloxane compound (α) represented by the following formula (1) and one or more kinds of a compound (β) represented by the following formula (2), to a hydrosilylation reaction;

a cyclic siloxane compound (B) containing, in one molecule, two or more carbon-carbon double bonds that are reactive with Si—H groups;

a polysiloxane compound (C) different from the prepolymer (A) and the cyclic siloxane compound (B); and a hydrosilylation catalyst (D):

[Chemical Formula 1]

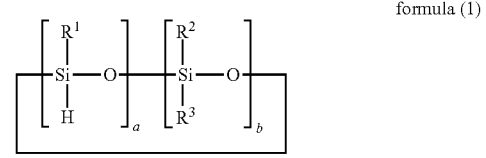

formula (1)

wherein in the formula (1), $R^1$, $R^2$ and $R^3$ each independently represent an alkyl group having 1 to 6 carbon atoms, or a phenyl group; a units of $R^1$ may be identical with or different from each other, and b units of $R^2$ and b units of $R^3$ may also be respectively identical with or different from each other; the symbol a represents the number from 2 to 10; and the symbol b represents the number from 0 to 8, while $a+b \geq 2$;

[Chemical Formula 2]

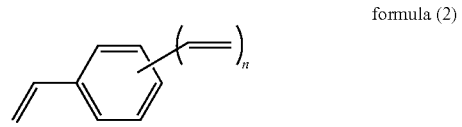

formula (2)

wherein in the formula (2), n represents 1 or 2.

Furthermore, the present invention provides a silicon-containing curable composition as described above, in which the cyclic siloxane compound (B) is a cyclic siloxane represented by the following formula (3).

[Chemical Formula 3]

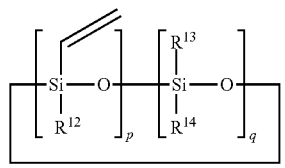

formula (3)

wherein in the formula (3), $R^{12}$, $R^{13}$ and $R^{14}$ each independently represent an alkyl group having 1 to 6 carbon atoms, or a phenyl group; p units of $R^{12}$ may be identical with or different from each other; q units of $R^{13}$ and q units of $R^{14}$ may also be respectively identical with or different from each other; the symbol p represents the number from 2 to 10; and the symbol q represents the number from 0 to 8, while $p+q \geq 2$.

Furthermore, the present invention provides a silicon-containing curable composition as described above, which further contains a filler. Also, the present invention provides a silicon-containing curable composition as described above, which further contains a compound having an isocyanuric acid structure.

The present invention also provides a cured product which is formed by curing the silicon-containing curable composition.

Effect of the Invention curable composition which has excellent transparency, gives the cured product having excellent heat resistance, adherence, colorability and transparency, and is useful for the insulating films of electric/electronic materials, sealing materials, low dielectric constant materials, adhesive materials, heat resistant materials, transparent materials, and the like.

BEST MODES FOR CARRYING OUT THE INVENTION

Hereinafter, the silicon-containing curable composition of the present invention, and a cured product formed by curing the composition will be described in detail.

The silicon-containing curable composition of the present invention is a composition containing a prepolymer (A) (hereinafter, also referred to as component (A)) containing two or more Si—H groups in one molecule, which is obtained by subjecting one or more kinds of a cyclic siloxane compound (α) represented by formula (1) (hereinafter, also referred to as component (α)) and one or more kinds of a compound (β) represented by formula (2) (hereinafter, also referred to as component ((β)), to a hydrosilylation reaction; a cyclic siloxane compound (B) (hereinafter, also referred to as component (B)) containing, in one molecule, two or more carbon-carbon double bonds that are reactive with Si—H groups; a polysiloxane compound (C) (hereinafter, also referred to as component (C)) that is different from the prepolymer (A) and the cyclic siloxane compound (B); and a hydrosilylation catalyst (D) (hereinafter, also referred to as component (D)).

First, the prepolymer, which is the component (A), will be described. The prepolymer of the component (A) is obtained by subjecting one or more kinds of compounds selected from each of the component (α) and the component (β) described below to a hydrosilylation reaction, and the prepolymer has two or more Si—H groups in one molecule.

The component (α) is a cyclic siloxane compound represented by the following formula (1) and containing two or more Si—H groups in one molecule. $R^1$ is preferably a methyl group from the viewpoint of industrial availability, and $R^2$ and $R^3$ are each preferably a methyl group or a phenyl group. a is preferably 4 to 6 from the viewpoint of the ease of production, and b is preferably 0 to 1 from the viewpoint of the crosslinking density of the curing reaction. When the component contains both a methyl group and a phenyl group, the ratio of the methyl group and the phenyl group in all of the substituents $R^1$ to $R^3$ is preferably 4:1 to 1:4.

[Chemical Formula 4]

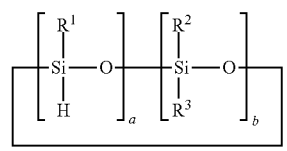

formula (1)

wherein in the formula (1), $R^1$, $R^2$ and $R^3$ each independently represent an alkyl group having 1 to 6 carbon atoms, or a phenyl group; a units of $R^1$ may be identical with or different from each other, and b units of $R^2$ and b units of $R^3$ may also be respectively identical with or different from each other; the symbol a represents the number from 2 to 10; and the symbol b represents the number from 0 to 8, while $a+b \geq 2$;

Specific examples of the component (α) include 1,3,5,7-tetramethylcyclotetrasiloxane, 1,3,5,7,9-pentamethylcyclopentasiloxane, and 1,3,5,7,9,11-hexamethylcyclohexasiloxane. From the viewpoints of easy industrial availability and having an appropriate number of Si—H functional groups, 1,3,5,7-tetramethylcyclotetrasiloxane is preferred. The component (α) may be used singly, or may be used in combination of two or more kinds.

The component (β) is a compound containing, in one molecule, two or more carbon-carbon double bonds that are reactive with Si—H groups, and is represented by the following formula (2).

[Chemical Formula 5]

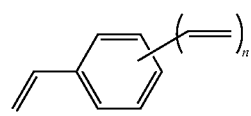

formula (2)

wherein in the formula (2), n represents 1 or 2.

The compound represented by the above formula (2), which is the component (β), represents divinylbenzene when n is 1, and this may be any one of o-divinylbenzene, m-divinylbenzene, and p-divinylbenzene. When n is 2, the compound represents trivinylbenzene, and specific examples thereof include 1,2,3-trivinylbenzene, 1,2,4-trivinylbenzene, and 1,3,5-trivinylbenzene. The compound represented by the above formula (2) may be a compound in which a functional group other than a vinyl group (for example, an alkyl group such as a methyl group) is bonded to a benzene ring, or may also be a mixture of such compounds. For the component (β), one kind of compound may be used singly, or two or more kinds of compounds may be used in combination.

In the compound represented by the formula (2), which is the component (β), the number of carbon-carbon double bonds that are reactive with Si—H groups (that is, the number of vinyl groups) is 2 to 3 per molecule as described for the formula (2), from the viewpoint of the crosslinking density.

The prepolymer of the component (A) is obtained by subjecting the component (α) and the component (β) described above to a hydrosilylation reaction. The reaction ratio of the component (α) and the component (β) is not particularly limited as long as the prepolymer of the component (A) is allowed to contain two or more Si—H groups per molecule. Preferably, from the viewpoint of the viscosity of the prepolymer, the ratio of the number (X) of the Si—H groups in the component (α) and the number (Y) of the carbon-carbon double bonds that are reactive with the Si—H groups in the compound (β) is such that X:Y=10:1 to 2:1, and more preferably X:Y=4:1 to 2:1. Even more preferably, it is desirable to select the reaction ratio such that the ratio of X:Y described above is satisfied in the range of 30 to 150 parts by mass of the component (β) relative to 100 parts by mass of the component (α).

The concentration of the Si—H groups carried by the prepolymer of the component (A) is preferably 0.0001 to 100 mmol/g, and more preferably 0.01 to 20 mmol/g, from the viewpoints of curability and storage stability.

The prepolymer of the component (A) is such that the weight average molecular weight is preferably 500 to 500,000, and from the viewpoint of heat resistance and handleability, the weight average molecular weight is more preferably 1,000 to 300,000. The measurement of the weight average molecular weight of the prepolymer may be carried out using GPC, and may be calculated relative to polystyrene standards.

It is recommended that the hydrosilylation reaction of the component (α) and the component (β) is carried out using a platinum-based catalyst. The platinum-based catalyst may be any known catalyst containing one or more kinds of metals of platinum, palladium and rhodium, which accelerates the hydrosilylation reaction. Examples of these platinum-based catalysts used as catalysts for hydrosilylation reaction include platinum-based catalysts such as a platinum carbonylvinylmethyl complex, a platinum divinyltetramethyldisiloxane complex, a platinum-cyclovinylmethylsiloxane complex, and a platinum-octylaldehyde complex, as well as compounds similarly containing palladium, rhodium and the like, which are platinum series metals, in place of platinum. These compounds may be used singly or in combination of two or more kinds. Particularly, from the viewpoint of curability, catalysts containing platinum are preferred, and specifically, a platinum divinyltetramethyldisiloxane complex (Karstedt catalyst) and a platinum carbonylvinylmethyl complex (Ossko catalyst) are preferred. Furthermore, so-called Wilkinson catalysts containing the above-mentioned platinum series metals, such as chlorotristriphenylphosphine rhodium(I), are also included in the platinum-based catalysts in the present invention. The amount of use of the platinum-based catalyst is preferably 5% by mass or less, and more preferably 0.0001 to 1.0% by mass, of the total amount of the component (α) and the component (β), from the viewpoint of reactivity. The conditions for the hydrosilylation reaction of the component (α) and the component (β) are not particularly limited, and the reaction may be carried out under conventionally known conditions using the catalyst described above. However, it is preferable to carry out the reaction at room temperature to 130° C. from the viewpoint of the curing rate, and conventionally known solvents such as toluene, hexane, MIBK (methyl isobutyl ketone), cyclopentanone, and PGMEA (propylene glycol monomethyl ether acetate) may also be used during the reaction.

The prepolymer of the component (A) is a prepolymer obtainable by subjecting the component (α), which is a cyclic siloxane compound, and the component (β), which is a compound containing, in one molecule, two or more carbon-carbon double bonds that are reactive with Si—H groups, to a hydrosilylation reaction. According to the present invention, major features lie in that the component (α) that constitutes the component (A) is cyclic, and that the component (α) is first made into a prepolymer together with the component (β), and then thus resulted prepolymer is used as a component to be incorporated into the curable composition. The silicon-containing curable composition of the present invention is such that since the component (α) that constitutes the component (A) has a cyclic structure, the composition has low cure shrinkage, and accordingly, a cured product having excellent adherence is obtained. Furthermore, since the composition can have a large silicon content while having low viscosity, a curable composition having excellent heat resistance can be obtained.

Next, the component (B) will be described. The component (B) is a cyclic siloxane compound containing, in one molecule, two or more carbon-carbon double bonds that are reactive with Si—H groups. The number of these double bonds is preferably 2 to 10, and from the viewpoint of the crosslinking density of the cured product, the number is more preferably 2 to 6. Furthermore, an example of this carbon-carbon double bond that is reactive with a Si—H group may be a carbon-carbon double bond contained in an alkenyl group such as a vinyl group, but particularly from the viewpoint of reactivity, the carbon-carbon double bond is preferably a vinyl group bonded to a silicon atom (Si—CH=CH₂ group).

Furthermore, a particularly preferred example of the component (B), from the viewpoint of the properties of the cured product, may be a cyclic siloxane compound represented by the following formula (3):

[Chemical Formula 6]

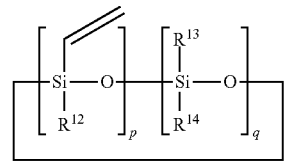

formula (3)

wherein in the formula (3), $R^{12}$, $R^{13}$ and $R^{14}$ each independently represent an alkyl group having 1 to 6 carbon atoms, or a phenyl group; p units of $R^{12}$ may be identical with or different from each other; q units of $R^{13}$ and q units of $R^{14}$ may also be respectively identical with or different from each other; the symbol p represents the number from 2 to 10; and the symbol q represents the number from 0 to 8, while p+q≥2.

In the above formula (3), from the viewpoint of industrial availability, $R^{12}$, $R^{13}$ and $R^{14}$ are each preferably a methyl group or a phenyl group. The symbol p is preferably 2 to 4 from the viewpoint of the crosslinking density, and the symbol q is preferably 1 to 3 from the viewpoint of viscosity. Preferred specific examples of the component (B) include cyclic siloxane compounds represented by the following formulas (4) to (6):

[Chemical Formula 7]

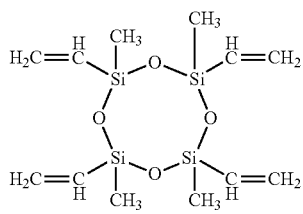

formula (4)

[Chemical Formula 8]

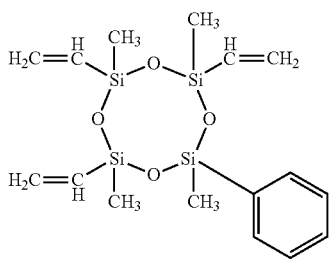

formula (5)

[Chemical Formula 9]

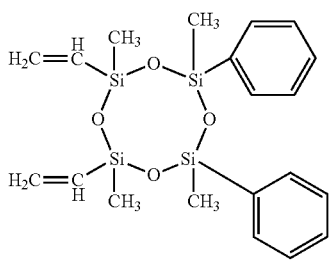

formula (6)

The component (B) described above is a cyclic siloxane compound containing, in one molecule, two or more carbon-carbon double bonds that are reactive with Si—H groups, and a major feature of the present invention also lies in that this component (B) is a cyclic siloxane compound. The silicon-containing curable composition of the present invention is such that, first, since the component (B) is a siloxane compound, the composition has superior heat resistance, transparency and the like as compared with the case where the component (B) is not a siloxane compound, and second, since the component (B) is a cyclic compound, the composition has superior adherence as compared with the case where the component (B) is a chain-like compound.

To be more specific, particularly excellent advantages that may be obtained when the component (B) is a cyclic siloxane compound containing, in one molecule, two or more carbon-carbon double bonds that are reactive with Si—H groups, include the following.

(1) Due to the cyclic structure, cure shrinkage is decreased, and accordingly, the component (B) acquires excellent adherence.

(2) The Si concentration can be increased, and heat resistance is likely to be enhanced.

(3) The features originally possessed by Si compounds, such as transparency and heat resistance, are all manifested without any change.

Next, the polysiloxane compound, which is the component (C) described above, will be described. In regard to the silicon-containing curable composition of the present invention, when the polysiloxane compound is added, yellowing of the cured product thus obtainable can be prevented, toughness can be imparted to the cured product, and the resin strength can be regulated.

As the polysiloxane compound described above as the component (C), any generally known compound can be used. For example, [i] a polysiloxane compound (C-a) containing an alkenyl group bonded to a silicon atom (hereinafter, also referred to as component (C-a)), or [ii] a polysiloxane compound (C-b) containing a hydrogen atom bonded to a silicon atom (hereinafter, also referred to as component (C-b)) can be used.

The component (C-a) and the component (C-b) described above can also be used in the form of [iii] a product obtained by subjecting the component (C-a) and the component (C-b) to a hydrosilylation reaction, or [iv] a product obtained by subjecting a four-component system of the component (A), the component (B), the component (C-a) and the component (C-b) described above, to a hydrosilylation reaction. The product of the above-described item [iii] and the product of the above-described item [iv] can be obtained as a polysiloxane compound containing an alkenyl group bonded to a silicon atom (that is, component (C-a)), or as a polysiloxane compound containing a hydrogen atom bonded to a silicon atom (that is, component (C-b)), by appropriately adjusting the reaction ratio in the hydrosilylation reaction for obtaining those products. Meanwhile, the hydrosilylation reaction may be carried out by a conventional method.

Furthermore, the components [i] to [iv] may be used singly or may be used in appropriate combination.

As the component (C), it is preferable to use the component (C-a) and the component (C-b) in combination. Particularly, it is preferable to use the product of the item [iii], which is the component (C-a), and the component (C-b) in combination, or to use the product of the item [iii], which is the component (C-b), and the component (C-a) in combination. When such a combination is used, the adherence of the silicon-containing curable composition can be enhanced, and the hardness of the cured product thus obtainable can be increased.

The use ratio of the component (C-a) and the component (C-b) may be appropriately determined by considering the ratio of the number of the Si—H groups contained in the component (C-b) and the number of the alkenyl groups contained in the component (C-a). However, the equivalent ratio of the Si—H groups and the alkenyl groups (former/latter) is preferably 0.5 to 10, and particularly preferably 1.0 to 5.0. If the equivalent ratio is less than 0.5, the silicon-containing curable composition does not cure, and if the equivalent ratio is larger than 10, there is a possibility that the composition may be colored. More preferably, it is desirable to select the use ratio such that the equivalent ratio is satisfied so as to make the mass ratio of the component (C-a) and the component (C-b) to be in the range of 3:1 to 1:3.

The polysiloxane compound as the component (C) is different from the component (A) and the component (B), and is preferably a chain-like polysiloxane compound. The proportion occupied by a straight-chain structure in the total molecular weight is preferably 80% or greater, and more preferably 90% or greater. A polysiloxane compound in which the relevant proportion is 100% can also be used with preference; however, it is also preferable that the polysiloxane compound contain a cyclic structure in the range of 20% or less. The cyclic structure can be introduced, for example, using the component (α) or the component (B) described above. For example, the component (α) or the component (B) described above, which has a cyclic structure, may be introduced into a compound mentioned below as an example as the component (C-a) or the component (C-b) using a conventional method. Meanwhile, the cyclic structure may be introduced to be disposed at the ends of the polysiloxane compound, or may be introduced to be disposed at areas other than the ends (within the polysiloxane chain).

The component (C-a) is such that the weight average molecular weight is preferably 5,000 to 50,000, and from the viewpoints of heat resistance and handleability, the weight average molecular weight is more preferably 10,000 to 40,000. If the weight average molecular weight is smaller than 5,000, the obtained cured product is weakened. If the weight average molecular weight is larger than 50,000, the viscosity of the silicon-containing curable composition increases, and there is a possibility that a problem in handleability may occur.

Furthermore, the component (C-b) is such that the weight average molecular weight is preferably 5,000 to 200,000, and from the viewpoints of heat resistance and handleability, the weight average molecular weight is more preferably 10,000 to 100,000. If the weight average molecular weight is smaller than 5,000, the obtained cured product is weakened, and if the weight average molecular weight is larger than 200,000, the viscosity of the silicon-containing curable composition increases, and there is a possibility that a problem in handleability may occur.

In regard to the polysiloxane compound containing an alkenyl group bonded to a silicon atom, which is the component (C-a), the alkenyl group may be a vinyl group, an allyl group or the like, and among others, a vinyl group is preferred due to the ease of synthesis. Furthermore, the alkenyl group may be bonded to a chain end, or may be bonded to a side chain. Also, it is preferable that the component (C-a) have two alkenyl groups.

In regard to the polysiloxane compound having a hydrogen atom bonded to the silicon atom, which is the component (C-b), the hydrogen atom may be bonded to a chain end, or may be bonded to a side chain.

Examples of the polysiloxane compound containing an alkenyl group bonded to a silicon atom, which is the component (C-a), include alkenyl group-containing polysiloxane compounds represented by the following formula (7) or (8).

the methylene chain of the terminal methyl group or the arylalkyl group having 7 to 18 carbon atoms may be interrupted with —O—, —S—, —CO—, —COO—, —OCO— or —C=C—, or the methylene chain of the alkyl group having 1 to 6 carbon atoms or the methylene chain of the terminal methyl group or the arylalkyl group having 7 to 18 carbon atoms may be substituted with a halogen atom, an amino group or an epoxy group; when there are a number of these interrupting groups or substituents, they may be identical with or different from each other; and x, y, z and r each independently represent the number from 0 to 10, and are in the relation: $1 \leq x+y+z+r \leq 10$.

[Chemical Formula 11]

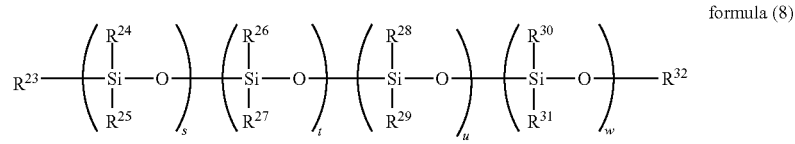

formula (8)

wherein in the formula (8), $R^{23}$ and $R^{32}$ each independently represent an alkyl group having 1 to 6 carbon atoms, an aryl group having 6 to 18 carbon atoms, or an arylalkyl group having 7 to 18 carbon atoms; $R^{24}$, $R^{25}$, $R^{26}$, $R^{27}$, $R^{28}$, $R^{29}$, $R^{30}$ and $R^{31}$ each independently represent an alkyl group having 1 to 6 carbon atoms, an aryl group having 6 to 18 carbon atoms, an arylalkyl group having 7 to 18 carbon atoms, or an alkenyl group having 2 to 6 carbon atoms; the methylene chain of the alkyl group having 1 to 6 carbon atoms or the methylene chain of the terminal methyl group or the arylalkyl group having 7 to 18 carbon atoms may be interrupted with —O—, —S—, —CO—, —COO—, —OCO— or —C=C—, or the methylene chain of the alkyl group having 1 to 6 carbon atoms or the methylene chain of the terminal methyl group or the arylalkyl group having 7 to 18 carbon atoms may be substituted with a halogen atom, an amino group or an epoxy group; when there are a number of these interrupting groups or substituents, they may be identical with or different from each other; at least one of $R^{24}$ to $R^{31}$ is an alkenyl group; and s, t, u and w each independently represent the number from 0 to 10, and are in the relation: $1 \leq s+t+u+w \leq 10$.

As the polysiloxane compound containing an alkenyl group bonded to a silicon atom, which is the component (C-a), commercially available products may be used, and examples include DMS-V00, DMS-V03, DMS-V05, DMS-V21, DMS-V22, DMS-V25, DMS-V31, DMS-V33, DMS-V35, DMS-V41, DMS-V42, DMS-V46, and DMS-V52 (vinyl-terminated polydimethylsiloxanes, manufactured by Gelest, Inc.); PDV-0325, PDV-0331, PDV-0341, PDV-0346,

[Chemical Formula 10]

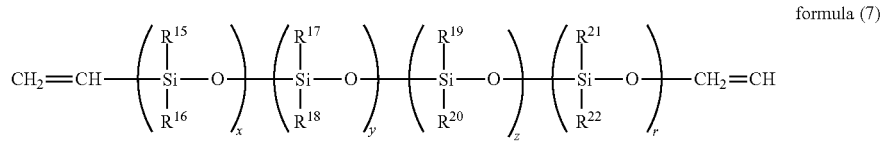

formula (7)

wherein in the formula (7), $R^{15}$, $R^{16}$, $R^{17}$, $R^{18}$, $R^{19}$, $R^{20}$, $R^{21}$ and $R^{22}$ each independently represent an alkyl group having 1 to 6 carbon atoms, an aryl group having 6 to 18 carbon atoms, or an arylalkyl group having 7 to 18 carbon atoms; the methylene chain of the alkyl group having 1 to 6 carbon atoms or PDV-0525, PDV-0541, PDV-1625, PDV-1631, PDV-1635, PDV-1641, PDV-2331, and PDV-2335 (vinyl-terminated diphenylsiloxane-dimethylsiloxane copolymers, manufactured by Gelest, Inc.); PMV-9925 (vinyl-terminated polyphenylmethylsiloxane, manufactured by Gelest, Inc.);

FMV-4031 (vinyl-terminated trifluoropropylmethylsiloxane-dimethylsiloxane copolymer, manufactured by Gelest, Inc.), EOV-2025 (vinyl-terminated diethylsiloxane-dimethylsiloxane copolymer, manufactured by Gelest, Inc.); VMN-010 (vinylmethoxysiloxane homopolymer, manufactured by Gelest, Inc.); VDT-123, VDT-127, VDT-131, VDT-153, VDT-431, VDT-731, VDT-954, VDS-2513, and VDV-0131 (dimethylsiloxane-dimethylsiloxane copolymer, manufactured by Gelest, Inc.); VGM-021, VGP-061, VGF-991, and DGM-000 (vinyl gums, manufactured by Gelest, Inc.); VMS-005 and VMS-T11 (vinylmethylsiloxane homopolymer, manufactured by Gelest, Inc.); VAT-4326 and VPT-1323 (vinylmethylsiloxane terpolymers, manufactured by Gelest, Inc.), and MVD8V (vinyl-terminated polydimethylsiloxane).

Examples of the polysiloxane compound containing a hydrogen atom bonded to a silicon atom, which is the component (C-b), include hydrogen atom-containing polysiloxane compounds represented by the following formula (9) or (10).

[Chemical Formula 12]

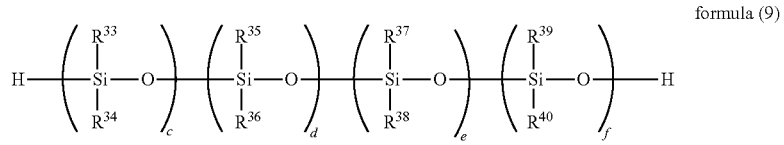

formula (9)

wherein in the formula (9), $R^{33}$, $R^{34}$, $R^{35}$, $R^{36}$, $R^{37}$, $R^{38}$, $R^{39}$ and $R^{40}$ each independently represent a hydrogen atom, an alkyl group having 1 to 6 carbon atoms, an aryl group having 6 to 18 carbon atoms, or an arylalkyl group having 7 to 18 carbon atoms; the methylene chain of the alkyl group having 1 to 6 carbon atoms or the methylene chain of the terminal methyl group or the arylalkyl group having 7 to 18 carbon atoms may be interrupted with —O—, —S—, —CO—, —COO—, —OCO— or —C═C—, or the methylene chain of the alkyl group having 1 to 6 carbon atoms or the methylene chain of the terminal methyl group or the arylalkyl group having 7 to 18 carbon atoms may be substituted with a halogen atom, an amino group or an epoxy group; when there are a number of these interrupting groups or substituents, they may be identical with or different from each other; and c, d, e and f each independently represent the number from 0 to 10, and are in the relation: $1 \leq c+d+e+f \leq 10$.

[Chemical Formula 13]

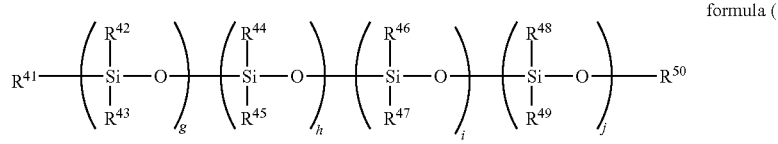

formula (10)

wherein in the formula (10), $R^{41}$ and $R^{50}$ each independently represent an alkyl group having 1 to 6 carbon atoms, an aryl group having 6 to 18 carbon atoms, or an arylalkyl group having 7 to 18 carbon atoms; $R^{42}$, $R^{43}$, $R^{44}$, $R^{45}$, $R^{46}$, $R^{47}$, $R^{48}$ and $R^{49}$ each independently represent a hydrogen atom, an alkyl group having 1 to 6 carbon atoms, an aryl group having 6 to 18 carbon atoms, or an arylalkyl group having 7 to 18 carbon atoms; the methylene chain of the alkyl group having 1 to 6 carbon atoms or the methylene chain of the terminal methyl group or the arylalkyl group having 7 to 18 carbon atoms may be interrupted with —O—, —S—, —CO—, —COO—, —OCO— or —C═C—, or the methylene chain of the alkyl group having 1 to 6 carbon atoms or the methylene chain of the terminal methyl group or the arylalkyl group having 7 to 18 carbon atoms may be substituted with a halogen atom, an amino group or an epoxy group; when there are a number of these interrupting groups or substituents, they may be identical with or different from each other; at least one of $R^{42}$ to $R^{49}$ is a hydrogen atom; and g, h, i and j each independently represent the number from 0 to 10, and are in the relation: $1 \leq g+h+i+j \leq 10$.

As the polysiloxane compound containing a hydrogen atom bonded to a silicon atom, which is the component (C-b), commercially available products may be used, and examples include DMS-H03, DMS-H21, DMS-H25, DMS-H31, and DMS-H41 (H-terminated polydimethylsiloxanes, manufactured by Gelest, Inc.); HDP-111 (polyphenyl(dimethyl-H-siloxy)siloxane-H terminal, manufactured by Gelest, Inc.); HPM-502 (methyl-H-siloxane-phenylmethylsiloxane copolymer, manufactured by Gelest, Inc.); HMS-013, HMS-031, HMS-064, HMS-071, HMS-151, HMS-301, and HMS-501 (methyl-H-siloxane-dimethylsiloxane copolymers, manufactured by Gelest, Inc.); HMS-991 and HMS-992 (polymethyl-H-siloxanes, manufactured by Gelest, Inc.); HES-992 (polyethyl-H-siloxane, manufactured by Gelest, Inc.); HAM-303 (methyl-H-siloxane-octylmethylsiloxane copolymer, manufactured by Gelest, Inc.), methyl hydrogen silicone oil (manufactured by Shin-Etsu Polymer Co., Ltd.), MHD6 MH and DMH-5A (H-terminated polydimethylsiloxanes, manufactured by Clariant International AG).

The contents of the component (A) and the component (B) in the silicon-containing curable composition of the present invention may be appropriately determined by considering the ratio of Si—H groups and the carbon-carbon double bonds that are reactive with Si—H groups; however, the equivalent ratio of the Si—H groups contained in the component (A) and the carbon-carbon double bonds that are contained in the component (B) and are reactive with Si—H groups (former/latter) is preferably 0.1 to 10, and particularly preferably 1.0 to 5.0. If the equivalent ratio is less than 0.1, the silicon-containing curable composition does not cure, and if the equivalent ratio is larger than 10, there is a possibility that the composition may be colored. More preferably, it is desirable to select the contents such that the equivalent ratio of the above-mentioned groups is satisfied in the range of 10 to 100 parts by mass of the component (B) relative to 100 parts by mass of the component (A).

Furthermore, the amount of the component (C) (in the case of using the component (C-a) and the component (C-b) in combination, the total amount of the two components) is preferably 0.1 to 10, and particularly preferably 0.2 to 4.0, as a mass ratio relative to the total amount of the component (A) and the component (B).

Next, the hydrosilylation catalyst, which is the component (D), will be described.

The hydrosilylation catalyst of the component (D) may be a platinum-based catalyst, and this may be a known catalyst containing one or more metals of platinum, palladium and rhodium that accelerate the hydrosilylation reaction. Examples of the platinum-based catalyst that may be used as a hydrosilylation catalyst include platinum-based catalysts such as a platinum-carbonylvinylmethyl complex, a platinum-divinyltetramethyldisiloxane complex, a platinum-cyclovinylmethylsiloxane complex, and a platinum-octylaldehyde complex; as well as compounds similarly containing palladium, rhodium and the like, which are platinum-series metals, in place of platinum. These may be used singly, or two or more kinds may be used in combination. Particularly, from the viewpoint of curability, hydrosilylation catalysts containing platinum are preferred, and specifically, a platinum-divinyltetramethylsiloxane complex (Karstedt catalyst) and a platinum-carbonylvinylmethyl complex (Ossko catalyst) are preferred. Furthermore, so-called Wilkinson catalysts containing the platinum-series metals described above, such as chlorotristriphenylphosphine rhodium (I), are also included in the platinum-based catalyst of the present invention.

The content of the component (D) in the silicon-containing curable composition of the present invention is preferably 5% by mass or less, and more preferably 0.0001% to 1.0% by mass, from the viewpoints of curability and storage stability. If the content is larger than 5% by mass, the silicon-containing curable composition tends to lack stability, and if the content is smaller than 0.0001% by mass, sufficient curability may not be obtained.

It is preferable that the silicon-containing curable composition of the present invention contain, in addition to the components (A) to (D) described above, a filler as an optional component. When a filler is incorporated, a cured product obtainable may be colored to a desired color, and the hardness of a cured product obtainable can be increased. Examples of the filler include minerals such as colloidal silica, silica gel, mica, and montmorillonite; metal oxides such as titanium oxide, iron oxide, aluminum oxide, magnesium oxide, zinc oxide, and beryllium oxide, or products obtained by modifying these through an organic modification treatment or the like; ceramics such as silicon nitride, aluminum nitride, boron nitride, and silicon carbide, or products obtained by modifying these through an organic modification treatment or the like; metal hydroxides such as aluminum hydroxide and magnesium hydroxide, or products obtained by modifying these through an organic modification treatment or the like; metal carbonates such as calcium carbonate, magnesium carbonate and barium carbonate, or products obtained by modifying these through an organic modification treatment or the like; metal borates, pigments such as carbon black; carbon fiber, graphite, whiskers, kaolin, talc, glass fiber, glass beads, layered clay minerals, clay, potassium titanate, silicon carbide, quartz, aluminum, zinc, wood meal, pulp, and cotton chips. The particle size of these fillers is preferably 100 μm or less, and more preferably 50 μm or less, from the viewpoint of heat resistance. The content of the filler in the silicon-containing curable composition of the present invention is preferably 90% by mass or less, and more preferably 50% by mass or less, from the viewpoints of heat resistance and handleability. When a filler is incorporated, in order to sufficiently exhibit the effect of the addition thereof, the content of the filler in the silicon-containing curable composition of the present invention is preferably 5% by mass or more.

In the silicon-containing curable composition of the present invention, a compound having a cyanuric acid structure may be further added, and thereby, adherence (adhesiveness) can be enhanced. Examples of the compound having a cyanuric acid structure that can be used include isocyanuric acid, triallylcyanuric acid, 1,3,5-triglycidylisocyanuric acid, triallylisocyanuric acid, 1-allyl-3,5-diglycidylisocyanuric acid, 1,3-diallyl-5-glycidylisocyanuric acid, tris(2-hydroxyethyl)isocyanuric acid, tris(2,3-dihydroxypropyl)isocyanuric acid, tris(2,3-epoxypropyl)isocyanuric acid, a compound represented by the formula shown below, and compounds described Japanese Patent No. 2768426, JP-A No. 3-261769, JP-A No. 4-139211, JP-A No. 4-139174, JP-A No. 10-333330, and the like. Furthermore, these compounds may also be subjected to various modification treatments such as silicone modification, ethylene oxide modification, and propylene oxide modification, by conventional methods. In the case of using a compound having a cyanuric acid structure, the content of the compound in the silicon-containing curable composition of the present invention is preferably 0.01 to 10% by mass, and more preferably 0.1 to 5% by mass.

[Chemical Formula 14]

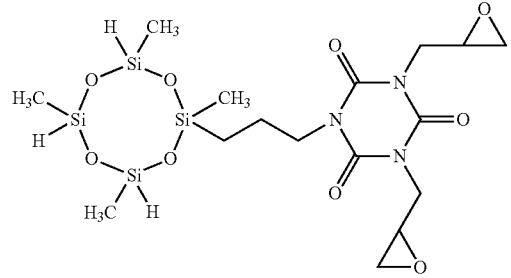

In the silicon-containing curable composition of the present invention, a free radical scavenger may also be incorporated as another optional component. The free radical scavenger in this case may be an antioxidizing substance such as an oxidation inhibitor or a stabilizer, and examples include triethylene glycol-bis[3-(3-t-butyl-5-methyl-4-hydroxyphenyl)propionate], dibutylhydroxytoluene (BHT), and 2,6-di-t-butyl-para-cresol (DBPC). The content of the free radical scavenger in the silicon-containing curable composition of the present invention is preferably 0.1 to 50% by mass, and more preferably 1 to 30% by mass, from the viewpoints of heat resistance, electrical characteristics, curability, mechanical characteristics, storage stability, and handleability.

Next, the cured product of the present invention will be described.

The silicon-containing curable composition of the present invention can be cured by heating the composition, and can be produced into a cured product. This curing reaction may be carried out by any method of a method of mixing the components to be incorporated of the silicon-containing curable composition of the present invention immediately before use; a method of mixing all the components in advance, and curing the components by heating or the like when the curing reaction is carried out; and the like.

The heating temperature in the case of curing is preferably 35° C. to 350° C., and more preferably 50° C. to 250° C. The curing time is preferably 0.01 to 10 hours, and more preferably 0.05 to 6 hours. When the curing reaction is carried out under these curing reaction conditions, a cured product having excellent performance such as heat resistance, durability and adherence can be obtained from the silicon-containing curable composition of the present invention.

The silicon-containing curable composition of the present invention has satisfactory fluidity at room temperature (25° C.) and has excellent handleability. In regard to fluidity, the viscosity measured with an E type viscometer at room temperature (25° C.) is preferably 1 Pa·S or less, and more preferably 0.1 Pa·S or less.

Furthermore, the cured product formed from the silicon-containing curable composition of the present invention has particularly excellent heat resistance and adherence. In regard to heat resistance, to be specific, a cured product for which the temperature causing a weight loss of the cured product of 5% by mass is preferably 400° C. or higher, and more preferably 500° C. or higher is suitably obtained. Furthermore, a cured product having less crack generation is suitably obtained from the silicon-containing curable composition of the present invention.

The silicon-containing curable composition of the present invention is such that a curing reaction based on the reaction between a Si—H group of the component (A) and a carbon-carbon double bond that is reactive with a Si—H group of the component (B) (for example, a Si—CH=CH$_2$ group) rapidly proceeds as a result of the effect of the curing reaction catalyst, which is the hydrosilylation catalyst of the component (D) (for example, a platinum-based catalyst). Furthermore, since the silicon-containing curable composition of the present invention is uniform and transparent, the transmissivity of light such as ultraviolet radiation is good, and when a photoreactive catalyst is added, photocuring is also possible. Of course, a photoreactive monomer or resin may be further incorporated, and any one or more of the components in the silicon-containing curable composition may have photoreactive groups. Furthermore, a material which is excellent in mechanical characteristics, optical characteristics, electrical characteristics and the like, such as weather resistance, hardness, contamination resistance, flame retardance, moisture resistance, gas barrier properties, flexibility, elongation or strength, electrical insulation properties, and low dielectric constant, can be obtained.

In the silicon-containing curable composition of the present invention, other various known resins, additives and the like can also be incorporated as optional components other than the filler and the compound having a cyanuric acid structure described above, to the extent that the intended performance of the present invention is not impaired. The amount of use of the optional components other than the filler and the compound having a cyanuric acid structure is not particularly limited, but in order not to impair the effect of the present invention, it is preferable to adjust the amount of use in the range of 5% by mass or less in the silicon-containing curable composition of the present invention. According to the present invention, any one or more kinds of the component (A), component (B), component (C) and component (D) can be imparted with further functions by attaching various organic functional groups. Furthermore, a highly functional composite material in which the silicon-containing curable composition of the present invention or a cured product thereof is used as a matrix, and other useful compounds are dispersed therein, can also be produced.

Examples of various resins that can be optionally incorporated include polyimide resins, polyether resins such as polyethylene glycol or polypropylene glycol, polyurethane resins, epoxy resins, phenolic resins, polyester resins, melamine resins, polyamide resins, and polyphenylene sulfide resins. Examples of the additives that can be optionally incorporated include an ultraviolet absorber, an antistatic agent, and an oxidation inhibitor.

The silicon-containing curable composition of the present invention has excellent transparency, and the cured product thereof can be used as a curable composition which is excellent in various properties such as heat resistance, light resistance, adherence, transparency, and colorability. The silicon-containing curable composition of the present invention and the cured product thereof can be used as a display material in the field of electrical/electronic materials, an optical material, a recording material, a sealing material for semiconductors, solar cells and the like; a high voltage insulating material; and various materials intended for insulation, vibration damping, waterproofing, and moisture-proofing. When the silicon-containing curable composition of the present invention is cured, film forming methods such as spin casting, potting and dipping can be appropriately used. Furthermore, in regard to the use, the silicon-containing curable composition can be applied to prototype molds for plastic parts, coating materials, interlayer insulating films, prepregs, gaskets for insulation, heat-shrink rubber tubing, O-rings, sealants for display devices and protective materials, waveguides, optical fiber protective materials, optical lenses, adhesives for optical instruments, highly heat resistant adhesives, elastic adhesives, tacky adhesives, die bonding agents, highly heat dissipating materials, highly heat resistant sealing materials, members for solar cells and fuel cells, solid electrolytes for cells, insulating coating materials, photosensitive drums for copying machines, and gas separating membranes. Furthermore, the silicon-containing curable composition can be applied to concrete protecting materials, linings, soil injection agents, sealing agents, heat or cold storage materials, glass coatings, foams, paints and the like in the fields of civil engineering and construction, and can also be applied to tubing, sealants, coating materials, sealants for sterilizers, contact lenses, oxygen enriching membranes and the like in the field of medical materials. In addition to those, the silicon-containing curable composition can also be applied to films, gaskets, mold materials, various molding materials, encapsulating agents for anti-rusting and waterproofing of wire glass, automobile parts, various machine parts and the like.

EXAMPLES

Hereinafter, the present invention will be described in more detail by way of Examples, but the present invention is not intended to be limited by these Examples. Meanwhile, the units "parts" and "percent (%)" used in the Examples are on a mass basis.

Synthesis Example 1

Component (A): Synthesis of Prepolymer 1

100 parts of 1,3,5,7-tetramethylcyclotetrasiloxane, 100 parts of divinylbenzene, 60 parts of toluene, and 0.0005 parts of a platinum-carbonylvinylmethyl complex (Ossko catalyst) were mixed, and while stirred, the mixture was heated to reflux for 5 hours. The solvent was distilled off under reduced pressure from the reaction liquid at 70° C., and thus a prepolymer 1, which is the component (A), was obtained.

An analysis by GPC was carried out, and as a result, the molecular weight of the prepolymer 1 was Mw=10,000, while the content of hydrosilyl groups (Si—H groups) as obtained by $^1$H-NMR was 5.3 mmol/g.

Synthesis Example 2

Component (A): Synthesis of Prepolymer 2

100 parts of 1,3,5,7-tetramethylcyclotetrasiloxane, 50 parts of divinylbenzene, 70 parts of 1-methoxy-2-propanol acetate, and 0.0001 parts of a platinum-carbonylvinylmethyl complex (Ossko catalyst) were mixed, and while stirred, the mixture was heated to reflux for 6 hours. The solvent was distilled off under reduced pressure from the reaction liquid at 50° C., and thus a prepolymer 2, which is the component (A), was obtained.

An analysis by GPC was carried out, and as a result, the molecular weight of the prepolymer 2 was Mw=140,000, while the content of hydrosilyl groups (Si—H groups) as obtained by $^1$H-NMR was 5.2 mmol/g.

Synthesis Example 3

Component (B): Synthesis of Cyclic Siloxane Compound

In a liquid mixture obtained by mixing and stirring 300 parts of 1,4-dioxane and 300 parts of hydrochloric acid, a mixture of 210 parts of methylvinyldichlorosilane and 90 parts of phenylmethyldichlorosilane was added dropwise. The mixture was allowed to react at room temperature for 30 minutes, and then was allowed to react at 70° C. for 3 hours, while the hydrochloric acid generated by a hydrolysis reaction was collected. After the reaction, between the liquid layers separated into two layers, the upper layer was subjected to purification by distillation under the conditions of 120° C. to 140° C. under a reduced pressure provided by a vacuum pump, and thus a cyclic siloxane compound 1 represented by the formula (5) described above, which is the component (B), was obtained.

An analysis was carried out by GC-MS, and as a result, the cyclic siloxane compound 1 contained a compound having a molecular weight of 395 at a proportion of 85% or more in terms of area ratio. An analysis by FT-IR was carried out, and as a result, the cyclic siloxane compound 1 did not exhibit any absorption corresponding to a hydroxyl group, which belongs to the absorption region of 3200 to 3600 cm$^{-1}$. Furthermore, an analysis by $^1$H-NMR was carried out, and as a result, it was recognized that the molar ratio of vinyl groups and phenyl groups was 3.3:1.0.

Synthesis Example 4

Component (B): Synthesis of Cyclic Siloxane Compound

In a liquid mixture obtained by mixing and stirring 300 parts of 1,4-dioxane and 300 parts of hydrochloric acid, a mixture of 140 parts of methylvinyldichlorosilane and 180 parts of phenylmethyldichlorosilane was added dropwise. The mixture was allowed to react at room temperature for 30 minutes, and then was allowed to react at 70° C. for 3 hours, while the hydrochloric acid generated by a hydrolysis reaction was collected. After the reaction, between the liquid layers separated into two layers, the upper layer was subjected to purification by distillation under the conditions of 135° C. to 150° C. under a reduced pressure provided by a vacuum pump, and thus a cyclic siloxane compound 2 represented by the formula (6) described above, which is the component (B), was obtained.

An analysis was carried out by GC-MS, and as a result, the cyclic siloxane compound 2 contained a compound having a molecular weight of 445 at a proportion of 85% or more in terms of area ratio. An analysis by FT-IR was carried out, and as a result, the cyclic siloxane compound 2 did not exhibit any absorption corresponding to a hydroxyl group, which belongs to the absorption region of 3200 to 3600 cm$^{-1}$. Furthermore, an analysis by $^1$H-NMR was carried out, and as a result, it was recognized that the molar ratio of vinyl groups and phenyl groups was 1.2:1.0.

Synthesis Example 5

Component (B): Synthesis of Cyclic Siloxane Compound 50 parts of the cyclic siloxane compound 1 obtained in Synthesis Example 3 and 50 parts of the cyclic siloxane compound 2 obtained in Synthesis Example 4 were mixed, and thus a cyclic siloxane compound 3, which is the component (B), was obtained.

Synthesis Example 6

Component (B): Synthesis of Cyclic Siloxane Compound 4

In a liquid mixture obtained by mixing and stirring 300 parts of 1,4-dioxane and 300 parts of hydrochloric acid, 280 parts of methylvinyldichlorosilane was added dropwise. The mixture was allowed to react at room temperature for 30 minutes, and then was allowed to react at 70° C. for 3 hours, while the hydrochloric acid generated by a hydrolysis reaction was collected. After the reaction, between the liquid layers separated into two layers, the upper layer was subjected to purification by distillation under the conditions of 120° C. under a reduced pressure provided by a vacuum pump, and thus a cyclic siloxane compound 4 represented by the formula (4) described above, which is the component (B), was obtained.

An analysis was carried out by GC-MS, and as a result, the molecular weight of the cyclic siloxane compound 4 was 345. An analysis by FT-IR was carried out, and as a result, the cyclic siloxane compound 4 did not exhibit any absorption corresponding to a hydroxyl group, which belongs to the absorption region of 3200 to 3600 cm$^{-1}$. Furthermore, the content of vinyl groups as measured by $^1$H-NMR was 11.6 mmol/g.

Synthesis Example 7

Component (C): Synthesis of Polysiloxane Compound 1

<Step 1> Synthesis of Polysiloxane Compound 1a 100 parts of dichlorodimethylsilane was added dropwise to a mixture of 100 parts of ion-exchanged water, 50 parts of toluene and 450 parts of a 48% aqueous solution of sodium hydroxide, and the mixture was polymerized at 105° C. for 5 hours. The reaction solution thus obtained was washed with 500 parts of ion-exchanged water, and then this toluene solution was dehydrated. 20 parts of pyridine was added thereto, 20 parts of dimethylvinylchlorosilane was further added thereto, and the resulting mixture was stirred at 70° for 30 minutes. Thereafter, the mixture was washed with 100 parts of ion-exchanged water, and then the solvent was distilled off under reduced pressure at 150° C. Subsequently, the residue was washed with 100 parts of acetonitrile, the solvent was distilled off at 70° C., and thus a polysiloxane compound 1a was obtained. An analysis by GPC (column: TSK-GEL MULTIPORE HXL M manufactured by Tosoh Corp., 7.8 mm×300 mm, developing solvent: tetrahydrofuran) was carried out, and as a result, the molecular weight of the polysiloxane compound 1a was Mw=20,000.

<Step 2> Synthesis of Polysiloxane Compound 1B 100 parts of the polysiloxane compound 1a obtained in Step 1 was dissolved in 200 parts of toluene, and 0.003 parts of a platinum catalyst and 10 parts of 1,3,5,7-tetramethylcyclotetrasiloxane, which is a cyclic polysiloxane compound, were added to the solution. The mixture was allowed to react at 105° C. for 2 hours. The solvent was distilled off under reduced pressure at 70° C., and then the residue was washed with 100 parts of acetonitrile. Thereafter, the solvent was distilled off at 70° C., and thus a polysiloxane compound 1b was obtained. An analysis by GPC was carried out, and as a result, the molecular weight of the polysiloxane compound 1b was Mw=22,000.

Meanwhile, the polysiloxane compound 1a and the polysiloxane compound 1b were used by simultaneously incorporating them into the silicon-containing curable composition that will be described below.

Synthesis Example 8

Component (C): Synthesis of Polysiloxane Compound 2

<Step 1> Synthesis of Polysiloxane Compound 2b 100 parts of dichlorodimethylsilane was added dropwise to a mixture of 100 parts of ion-exchanged water, 50 parts of toluene and 450 parts of a 48% aqueous solution of sodium hydroxide, and the mixture was polymerized at 105° C. for 5 hours. The reaction solution thus obtained was washed with 500 parts of ion-exchanged water, and then this toluene solution was dehydrated. 20 parts of pyridine was added thereto, 20 parts of dimethylchlorosilane was further added thereto, and the resulting mixture was stirred at 70° C. for 30 minutes. Thereafter, the mixture was washed with 100 parts of ion-exchanged water, and then the solvent was distilled off at 60° C. Subsequently, the residue was washed with 100 parts of acetonitrile, the solvent was distilled off at 60° C., and thus a polysiloxane compound 2b was obtained. An analysis by GPC was carried out, and as a result, the molecular weight of the polysiloxane compound 2b was Mw=30,000.

<Step 2> Synthesis of Polysiloxane Compound 2a 100 parts of the polysiloxane compound 2b obtained in Step 1 was dissolved in 200 parts of toluene, and 0.003 parts of a platinum catalyst and 10 parts of 1,3,5,7-tetramethyl-1,3,5,7-tetravinylcyclotetrasiloxane, which is a cyclic polysiloxane compound having unsaturated bonds, were added to the solution. The mixture was allowed to react at 105° C. for 2 hours. The solvent was distilled off under reduced pressure at 70° C., and then the residue was washed with 100 parts of acetonitrile. Thereafter, the solvent was distilled off at 70° C., and thus a polysiloxane compound 2a was obtained. An analysis by GPC was carried out, and as a result, the molecular weight of the polysiloxane compound 2a was Mw=35,000.

Meanwhile, the polysiloxane compound 2a and the polysiloxane compound 2b were used by simultaneously incorporating them into the silicon-containing curable composition that will be described below.

Example 1

Silicon-Containing Curable Composition 1

100 parts of the prepolymer 1 obtained in Synthesis Example 1 as the component (A), 45 parts of the cyclic siloxane compound 1 obtained in Synthesis Example 3 as the component (B), 240 parts of the polysiloxane compound 1a and 100 parts of the polysiloxane compound 1b obtained in Synthesis Example 7 as the component (C), and 0.0001 parts of a platinum-carbonylvinylmethyl complex as the component (D) were blended, and thus a silicon-containing curable composition 1 of the present invention was obtained.

The silicon-containing curable composition 1 thus obtained was cured by a curing method such as described below, and thus a cured product was obtained. Smoke generation did not occur during the curing, and a colorless, transparent cured product having toughness was obtained.

<Curing Method>

1) Curing Method in Production of Specimen Provided for Confirmation of Curability and Heat Resistance Test A curable composition was uniformly poured into a mold made of a Teflon (registered trademark) resin having a thickness of 1 mm, and the curable composition was preliminarily heated for 30 minutes in an oven adjusted to 100° C., and then was further heated for one hour in an oven adjusted to 150° C. Thus, a cured product was obtained.

2) Curing Method in Production of Specimen Provided for Transparency Test and Whiteness Measurement Test A silicone sheet having a thickness of 1 mm was interposed as a spacer between glass plates coated with a releasing agent, and a curable composition was inserted to perform a degassing treatment. Subsequently, the assembly was heated at 150° C. for 90 minutes, and thus a flat cured product having a thickness of 1 mm was obtained.

3) Curing Method in Production of Specimen Provided for Adherence Test

A curable composition was applied on various materials (glass, a silicon wafer, a copper plate, a ceramic, and a silver foil) using a bar coater, and the curable composition was cured at 150° C. for 90 minutes.

Example 2

Silicon-Containing Curable Composition 2

100 parts of the prepolymer 1 obtained in Synthesis Example 1 as the component (A), 30 parts of the cyclic siloxane compound 1 obtained in Synthesis Example 3 as the component (B), 90 parts of the polysiloxane compound 2a and 40 parts of the polysiloxane compound 2b obtained in Synthesis Example 8 as the component (C), and 0.0001 parts of a platinum-carbonylvinylmethyl complex as the component (D) were blended, and thus a silicon-containing curable composition 2 of the present invention was obtained.

The silicon-containing curable composition 2 thus obtained was cured by the same curing method as that used in Example 1, and thus a cured product was obtained. Smoke generation did not occur during curing, and a colorless, transparent, hard cured product was obtained.

Example 3

Silicon-Containing Curable Composition 3

100 parts of the prepolymer 2 obtained in Synthesis Example 2 as the component (A), 40 parts of the cyclic siloxane compound 1 obtained in Synthesis Example 3 as the component (B), 40 parts of PDV-1631 (vinyl-terminated diphenylsiloxane-dimethylsiloxane copolymer, manufactured by Gelest, Inc.; hereinafter, also referred to as polysiloxane compound 3a) and 20 parts of HPM-502 (methyl-H-siloxane-phenylmethylsiloxane copolymer, manufactured by Gelest, Inc.; hereinafter, also referred to as polysiloxane compound 3b) as the component (C), 0.0001 parts of a platinum-carbonylvinylmethyl complex as the component (D), and 200 parts of spherical nanosilica as the component (E) were blended, and thus a silicon-containing curable composition 3 of the present invention was obtained.

The silicon-containing curable composition 3 thus obtained was cured by the same curing method as that used in Example 1, and thus a cured product was obtained. Smoke generation did not occur during curing, and a colorless, transparent, hard cured product was obtained.

Example 4

Silicon-Containing Curable Composition 4

100 parts of the prepolymer 2 obtained in Synthesis Example 2 as the component (A), 60 parts of the cyclic siloxane compound 2 obtained in Synthesis Example 4 as the component (B), 110 parts of the polysiloxane compound 3a and 50 parts of the polysiloxane compound 3b as the component (C), 0.0001 parts of a platinum-carbonylvinylmethyl complex as the component (D), and 300 parts of silica and 50 parts of alumina as the component (E) were blended, and thus a silicon-containing curable composition 4 of the present invention was obtained.

The silicon-containing curable composition 4 thus obtained was cured by the same curing method as that used in Example 1, and thus a cured product was obtained. Smoke generation did not occur during curing, and a white, hard cured product was obtained.

Example 5

Silicon-Containing Curable Composition 5

100 parts of the prepolymer 1 obtained in Synthesis Example 1 as the component (A), 50 parts of the cyclic siloxane compound 3 obtained in Synthesis Example 5 as the component (B), 100 parts of the polysiloxane compound 1a and 50 parts of the polysiloxane compound 1b obtained in Synthesis Example 7 as the component (C), 0.0001 parts of a platinum-carbonylvinylmethyl complex as the component (D), and 100 parts of titanium oxide, 100 parts of silica and 5 parts of silicone-modified isocyanurate as the component (E) were blended, and thus a silicon-containing curable composition 5 of the present invention was obtained.

The silicon-containing curable composition 5 thus obtained was cured by the same curing method as that used in Example 1, and thus a cured product was obtained. Smoke generation did not occur during curing, and a white, hard cured product was obtained.

Example 6

Silicon-Containing Curable Composition 6

100 parts of the prepolymer 2 obtained in Synthesis Example 2 as the component (A), 30 parts of the cyclic siloxane compound 4 obtained in Synthesis Example 6 as the component (B), 120 parts of the polysiloxane compound 1a and 55 parts of the polysiloxane compound 1b obtained in Synthesis Example 7 as the component (C), 0.0001 parts of a platinum-carbonylvinylmethyl complex as the component (D), and 10 parts of carbon black, 200 parts of silica, 10 parts of glass fiber, and 3 parts of triallyl isocyanurate as the component (E) were blended, and thus a silicon-containing curable composition 6 of the present invention was obtained.

The silicon-containing curable composition 6 thus obtained was cured by the same curing method as that used in Example 1, and thus a cured product was obtained. Smoke generation did not occur during curing, and a black, hard cured product was obtained.

Example 7

Silicon-Containing Curable Composition 7

100 parts of the prepolymer 2 obtained in Synthesis Example 2 as the component (A), 60 parts of the cyclic siloxane compound 2 obtained in Synthesis Example 4 as the component (B), 130 parts of the polysiloxane compound 3a and 30 parts of the polysiloxane compound 3b as the component (C), and 0.0001 parts of a platinum-carbonylvinylmethyl complex as the component (D) were blended, and thus a silicon-containing curable composition 7 of the present invention was obtained.

The silicon-containing curable composition 7 thus obtained was cured by the same curing method as that used in Example 1, and thus a cured product was obtained. Smoke generation did not occur during curing, and a colorless, transparent, hard cured product was obtained.

Example 8

Silicon-Containing Curable Composition 8

100 parts of the prepolymer 1 obtained in Synthesis Example 1 as the component (A), 50 parts of the cyclic siloxane compound 3 obtained in Synthesis Example 5 as the component (B), 50 parts of the polysiloxane compound 1a and 100 parts of the polysiloxane compound 1b obtained in Synthesis Example 7 as the component (C), 0.0001 parts of a platinum-carbonylvinylmethyl complex as the component (D), and 5 parts of a silicone-modified isocyanurate were blended, and thus a silicon-containing curable composition 8 of the present invention was obtained.

The silicon-containing curable composition 8 thus obtained was cured by the same curing method as that used in Example 1, and thus a cured product was obtained. Smoke generation did not occur during curing, and a colorless, transparent, hard cured product was obtained.

Example 9

Silicon-Containing Curable Composition 9

100 parts of the prepolymer 2 obtained in Synthesis Example 2 as the component (A), 30 parts of the cyclic siloxane compound 4 obtained in Synthesis Example 6 as the component (B), 95 parts of the polysiloxane compound 1a and 80 parts of the polysiloxane compound 1b obtained in Synthesis Example 7 as the component (C), 0.0001 parts of a platinum-carbonylvinylmethyl complex as the component (D), and 50 parts of aluminum oxide, 50 parts of calcium carbonate, 10 parts of kaolin, and 3 parts of triallyl isocyanurate as the component (E) were blended, and thus a silicon-containing curable composition 9 of the present invention was obtained.

The silicon-containing curable composition 9 thus obtained was cured by the same curing method as that used in Example 1, and thus a cured product was obtained. Smoke generation did not occur during curing, and a colorless, transparent, hard cured product was obtained.

Comparative Example 1

100 parts of the prepolymer 1 obtained in Synthesis Example 1 as the component (A), 45 parts of the cyclic siloxane compound 1 obtained in Synthesis Example 3 as the component (B), and 0.0001 parts of a platinum-carbonylvinylmethyl complex as the component (D) were blended, and thus a curable composition comparative product 1 was obtained. The curable composition comparative product 1 thus obtained was cured by the same curing method as that used in Example 1, and thus a cured product comparative product was obtained. After curing, cracks were recognized in some parts.

Comparative Example 2

100 parts of the prepolymer 2 obtained in Synthesis Example 2 as the component (A), 30 parts of the cyclic siloxane compound 1 obtained in Synthesis Example 3 as the component (B), and 0.0001 parts of a platinum-carbonylvinylmethyl complex as the component (D) were blended, and thus a curable composition comparative product 2 was obtained. The curable composition comparative product 2 thus obtained was cured by the same curing method as that used in Example 1, and thus a cured product comparative product was obtained. After curing, cracks were recognized in some parts.

Comparative Example 3

100 parts of 1,3,5,7-tetramethylcyclotetrasiloxane, 20 parts of divinylbenzene, 95 parts of the polysiloxane compound 1a and 80 parts of the polysiloxane compound 1b obtained in Synthesis Example 7 as the component (C), and 0.0005 parts of a platinum-divinyltetramethyldisiloxane complex (Karstedt catalyst) were blended, and thus a curable composition comparative product 3 was obtained. The curable composition comparative product 3 thus obtained was cured by the same curing method as that used in Example 1, and thus a cured product comparative product was obtained. After curing, cracks were recognized in some parts.

Test Example

The cured products obtained in Examples 1 to 9 and the cured product comparative products of Comparative Examples 1 to 3 were used as specimens, and tests for heat resistance and adherence were respectively carried out by the methods described below.

The cured products obtained in Examples 1 to 5 and 7 to 9 were also subjected to a test for transparency or whiteness. Meanwhile, the test for transparency or whiteness was carried out such that those specimens that could not be subjected to a test for transparency because they contained a filler, were subjected to a test for whiteness. Furthermore, in regard to the cured product of Example 6, since the product contained carbon black, the test for transparency or whiteness was not carried out.

These test results are presented in Table 1.

<Heat Resistance Test>

For each of the cured products, the 1% weight loss temperature and the 5% weight loss temperature were measured with a thermal analysis apparatus (TG-DTA).

The apparatus used in the measurement and the measurement conditions were as follows.

Measurement apparatus: SSC/5200 manufactured by Seiko Instruments, Inc.

Measurement conditions: Temperature range 100° C. to 550° C., rate of temperature increase 10° C./min From the results of Table 1, it was found that the cured products of the present invention obtained in Examples 1 to 9 had high heat resistant temperatures. On the contrary, in the cured product comparative products obtained in Comparative Examples 1 to 3, it is speculated that since volatile components scattered, the balance in the equivalent ratio of vinyl groups and Si—H groups was destroyed, and thus the cured products exhibited merely low heat resistant temperatures.

<Adherence Test>

Each of the cured products cured on a glass plate a silicon wafer, a copper plate, a ceramic or a silver foil, having a size of 1.5 cm×5.0 cm was scrubbed with a spatula made of stainless steel, and adherence was evaluated according to the following evaluation criteria.

5: Not peeled off even if scrubbed.
4: Not easily peeled off.
3: Peeled off when scrubbed several times.
2: Easily peeled off.
1: Does not adhere.

<Transparency Test>

For each of the cured products, transmittance was measured with an ultraviolet-visible-near infrared spectrophotometer (manufactured by JASCO Corp.; Ubest V-550).

<Hunter Whiteness>

For each of the cured products, the Hunter whiteness was measured with a spectral colorimeter (Nippon Denshoku Industries Co., Ltd.; SE6000) (blank white board 97.94).

TABLE 1

| | | Example | | | | | | | | | Comparative Example | | |
|---|---|---|---|---|---|---|---|---|---|---|---|---|---|
| | | 1 | 2 | 3 | 4 | 5 | 6 | 7 | 8 | 9 | 1 | 2 | 3 |
| Heat resistance | 5% weight loss temperature | 470 | 480 | 480 | >550 | >550 | >550 | 490 | 480 | >550 | 510 | 520 | 420 |
| | 1% weight loss temperature | 350 | 365 | 370 | 415 | 420 | 420 | 365 | 370 | 410 | 320 | 320 | 280 |

TABLE 1-continued

|  |  | Example | | | | | | | | | Comparative Example | | |
| --- | --- | --- | --- | --- | --- | --- | --- | --- | --- | --- | --- | --- | --- |
|  |  | 1 | 2 | 3 | 4 | 5 | 6 | 7 | 8 | 9 | 1 | 2 | 3 |
| Adherence | Glass | 5 | 5 | 5 | 5 | 5 | 5 | 5 | 5 | 5 | 5 | 4 | 2 |
|  | Silicon wafer | 5 | 5 | 5 | 5 | 5 | 5 | 5 | 5 | 5 | 5 | 4 | 2 |
|  | Copper plate | 5 | 5 | 5 | 5 | 5 | 5 | 5 | 5 | 5 | 4 | 3 | 2 |
|  | Ceramic | 5 | 5 | 5 | 5 | 5 | 5 | 5 | 5 | 5 | 2 | 2 | 2 |
|  | Silver foil | 5 | 5 | 5 | 5 | 5 | 5 | 5 | 5 | 5 | 2 | 2 | 2 |
| Transparency (% T) |  | >90 | >90 | >70 | — | — | — | >90 | >90 | — | >70 | >70 | >60 |
| Hunter whiteness |  | — | — | — | 95 | 96 | — | — | — | 93 | — | — | — |

From the results of Table 1, it was clearly seen that the cured products of the silicon-containing curable compositions of the present invention are excellent in heat resistance, adherence, and colorability or transparency.

The invention claimed is:

1. A silicon-containing curable composition comprising:
   a prepolymer (A) containing two or more Si—H groups in one molecule, which is obtainable by subjecting one or more cyclic siloxane compounds (α) represented by formula (1) and one or more compounds (β) represented by formula (2), to a hydrosilylation reaction;
   a cyclic siloxane compound (B) containing, in one molecule, two or more carbon-carbon double bonds that are reactive with Si—H groups;
   a polysiloxane compound (C) represented by formula (7), formula (8), formula (9), formula (10) or combinations thereof; and
   a hydrosilylation catalyst (D),

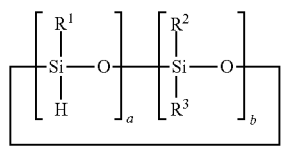
formula (1)

wherein $R^1$, $R^2$ and $R^3$ each independently represent an alkyl group having 1 to 6 carbon atoms, or a phenyl group;
$R^1$ may be identical with or different from each other in each "a" unit, and $R^2$ and $R^3$ may be identical with or different from each other in each "b" unit;
the symbol a represents a number from 2 to 10; and
the symbol b represents a number from 0 to 8, and a +b ≥2;

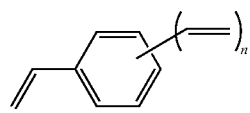
formula (2)

wherein n is 1 or 2;

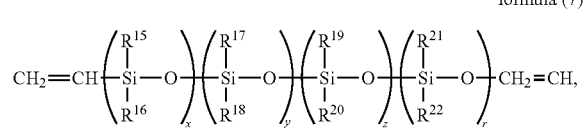
formula (7)

wherein $R^{15}$, $R^{16}$, $R^{17}$, $R^{18}$, $R^{19}$, $R^{20}$, $R^{21}$ and $R^{22}$ each independently represents an alkyl group having 1 to 6 carbon atoms, an aryl group having 6 to 18 carbon atoms, or an aryl alkyl group having 7 to 18 carbon atoms, and the methylene chain of the alkyl group or the methylene chain of the terminal methyl group of the aryl alkyl group may independently be interrupted with —O—, —S—, —CO—, —COO—, —OCO— or —C═C—, or the methylene chain of the alkyl group or the methylene chain of the terminal methyl group of the aryl alkyl group may independently be substituted with a halogen atom, an amino group or an epoxy group, and
x, y, z and r each independently represents a number from 0 to 10, and 1≤x+y+z+r≤10;

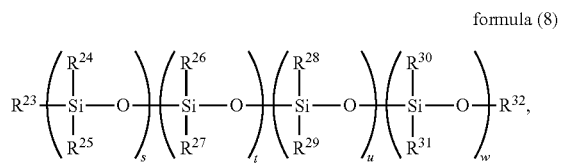
formula (8)

wherein $R^{23}$ and $R^{32}$ each independently represents an alkyl group having 1 to 6 carbon atoms, an aryl group having 6 to 18 carbon atoms, or an aryl alkyl group having 7 to 18 carbon atoms,
$R^{24}$, $R^{25}$, $R^{26}$, $R^{27}$, $R^{28}$, $R^{29}$, $R^{30}$ and $R^{31}$ each independently represents an alkyl group having 1 to 6 carbon atoms, an aryl group having 6 to 18 carbon atoms, an aryl alkyl group having 7 to 18 carbon atoms, or an alkenyl group having 2 to 6 carbon atoms, the methylene chain of the alkyl group or the methylene chain of the terminal methyl group of the aryl alkyl group may independently be interrupted with —O—, —S—, —CO—, —COO—, —OCO— or —C═C—, or the methylene chain of the alkyl group or the methylene chain of the terminal methyl group of the aryl alkyl group may independently be substituted with a halogen atom, an amino group or an epoxy group,
at least one of $R^{24}$ to $R^{31}$ is an alkenyl group, and
s, t, u and w each independently represents a number from 0 to 10, and 1≤s+t+U+W≤10;

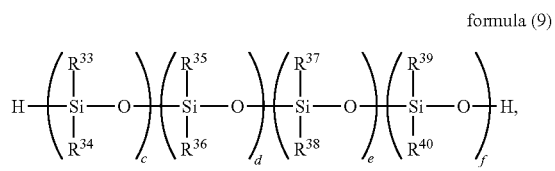
formula (9)

wherein $R^{33}$, $R^{34}$, $R^{35}$, $R^{36}$, $R^{37}$, $R^{38}$, $R^{39}$ and $R^{40}$ each independently represents a hydrogen atom, an alkyl group having 1 to 6 carbon atoms, an aryl group having 6 to 18 carbon atoms, or an aryl alkyl group having 7 to 18 carbon atoms; the methylene chain of the alkyl group or the methylene chain of the terminal methyl group of the aryl alkyl group may independently be interrupted with —O—, —S—, —CO—, —COO—, —OCO— or —C=C—, or the methylene chain of the alkyl group or the methylene chain of the terminal methyl group of the aryl alkyl may idependently be substituted with a halogen atom, an amino group or an epoxy group, and c, d, e and f each independently represents a number from 0 to 10, and $1 \leq c+d+e+f \leq 10$;

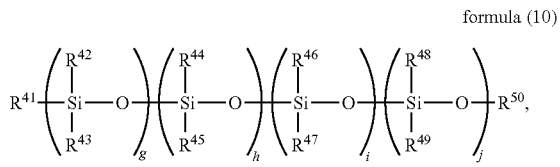

formula (10)

wherein $R^{41}$ and $R^{50}$ each independently represents an alkyl group having 1 to 6 carbon atoms, an aryl group having 6 to 18 carbon atoms, or an aryl alkyl group having 7 to 18 carbon atoms, $R^{42}$, $R^{43}$, $R^{44}$, $R^{45}$, $R^{46}$, $R^{47}$, $R^{48}$ and $R^{49}$ each independently represents a hydrogen atom, an alkyl group having 1 to 6 carbon atoms, an aryl group having 6 to 18 carbon atoms, or an aryl alkyl group having 7 to 18 carbon atoms, the methylene chain of the alkyl group or the methylene chain of the terminal methyl group of the arylalkyl group may independently be interrupted with —O—, —S—, —CO—, —COO—, —OCO— or —C=C—, or the methylene chain of the alkyl group or the methylene chain of the terminal methyl group of the arylalkyl group may independently be substituted with a halogen atom, an amino group or an epoxy group, at least one of $R^{42}$ to $R^{49}$ is a hydrogen atom, and g, h, i and j each independently represents a number from 0 to 10, and $1 \leq g+h+i+j \leq 10$.

2. The silicon-containing curable composition according to claim 1, wherein the cyclic siloxane compound (B) is a cyclic siloxane represented by formula (3):

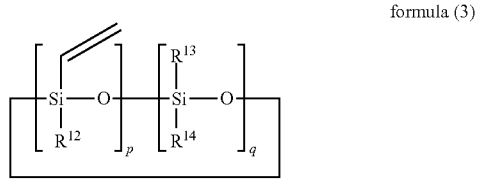

formula (3)

wherein, $R^{12}$, $R^{13}$ and $R^{14}$ each independently represents an alkyl group having 1 to 6 carbon atoms, or a phenyl group;

$R^{12}$ may be identical with or different from each other in each "p" unit;

$R^{13}$ and $R^{14}$ may be identical with or different from each other in each "q" unit;

the symbol p represents a number from 2 to 10; and the symbol q represents a number from 0 to 8, and $p+q \geq 2$.

3. The silicon-containing curable composition according to claim 1, wherein the polysiloxane compound (C) is a combination of (i) at least one compound of formula (7) or formula (8), and (ii) at least one compound of formula (9) or formula (10).

4. The silicon-containing curable composition according to claim 1, further comprising a filler.

5. The silicon-containing curable composition according to claim 1, further comprising isocyanuric acid and derivatives thereof.

6. A cured product obtained by curing the silicon-containing curable composition according to claim 1.

7. The silicon-containing curable composition according to claim 2, wherein the polysiloxane compound (C) is a combination of (i) at least one compound of formula (7) or formula (8), and (ii) at least one compound of formula (9) or formula (10).

8. The silicon-containing curable composition according to claim 2, further comprising a filler.

9. The silicon-containing curable composition according to claim 3, further comprising a filler.

10. The silicon-containing curable composition according to claim 2, further comprising isocyanuric acid and derivatives thereof.

11. The silicon-containing curable composition according to claim 3, further comprising isocyanuric acid and derivatives thereof.

12. The silicon-containing curable composition according to claim 4, further comprising isocyanuric acid and derivatives thereof.

13. A cured product obtained by curing the silicon-containing curable composition according to claim 2.

14. A cured product obtained by curing the silicon-containing curable composition according to claim 3.

* * * * *